United States Patent
Huang et al.

(10) Patent No.: US 8,001,395 B2
(45) Date of Patent: Aug. 16, 2011

(54) PORTABLE ELECTRONIC DEVICE HAVING SYNCHRONOUS PROCESSING MODULE

(75) Inventors: Shuo-Ta Huang, Taipei Hsien (TW); Yung-Shen Chen, Taipei Hsien (TW)

(73) Assignee: ACER Incorporated, Taipei Hsien (TW)

(*) Notice: Subject to any disclaimer, the term of this patent is extended or adjusted under 35 U.S.C. 154(b) by 812 days.

(21) Appl. No.: 12/024,525

(22) Filed: Feb. 1, 2008

(65) Prior Publication Data

US 2009/0172426 A1    Jul. 2, 2009

(30) Foreign Application Priority Data

Dec. 27, 2007  (TW) .............................. 96150592 A

(51) Int. Cl.
*G06F 1/26* (2006.01)
*G06F 1/32* (2006.01)

(52) U.S. Cl. ........ 713/300; 713/310; 713/320; 713/340; 711/147; 711/148

(58) Field of Classification Search .................. 713/300, 713/310, 320, 323, 324, 340; 711/147, 148
See application file for complete search history.

(56) References Cited

U.S. PATENT DOCUMENTS

| 6,735,671 B1* | 5/2004 | Kida .............................. 711/111 |
| 2010/0281183 A1* | 11/2010 | Van Bebber ...................... 710/5 |

* cited by examiner

*Primary Examiner* — Thomas Lee
*Assistant Examiner* — Michael J Brown
(74) *Attorney, Agent, or Firm* — Kirton & McConkie; Evan R. Witt

(57) ABSTRACT

A portable electronic device includes a system chip, an enabling switch, a signal conversion circuit, a power switching circuit, a storage medium and a synchronous processing module. The enabling switch is triggered to issue an analog signal. The signal conversion circuit converts the analog signal into a digital control signal. The power switching circuit selects one of multiple power sources to be outputted as a voltage signal. The storage medium receives the voltage signal. The synchronous processing module is electrically connected to the system chip, the storage medium, the signal conversion circuit, the power switching circuit and the transmission line. In response to the digital control signal, the storage medium is communicated with an external electronic device through a transmission line, so that the storage medium of the portable electronic device is used as an external storage medium of the external electronic device.

11 Claims, 4 Drawing Sheets

PORTABLE ELECTRONIC DEVICE HAVING SYNCHRONOUS PROCESSING MODULE

FIELD OF THE INVENTION

The present invention relates to a portable electronic device, and more particularly to a portable electronic device having a synchronous processing module.

BACKGROUND OF THE INVENTION

With increasing development of information devices, a variety of 3C electronic devices such as household-use electronic devices and portable electronic devices are brought forth and the old ones are weeded out soon. Examples of these 3C electronic devices include personal computers (PCs), notebook computers (NBs), personal digital assistants (PDAs), mobile phones and the like. For sharing information between at least two electronic devices, it is necessary to store the same data into these electronic devices so as to achieve the purpose of synchronous replication. The synchronous replication process involves transferring some or all data between the electronic devices so that these electronic devices have the current profile information. Generally, "temporary" synchronous replication between two electronic devices is rendered by using specified software, components or processes. If some of the data stored in one electronic device have been modified, the data stored in these electronic devices become different. Therefore, the synchronous replication should be executed again to have these electronic devices store the same data.

Take the synchronous replication between a personal computer (PC) and a personal digital assistant (PDA) for example. A user may share a calendar and a contact list between the PC and the PDA with popular programs, for example Outlook using synchronization software, e.g. Microsoft's ActiveSync. Moreover, an example of the transmission interface includes but is not limited to a USB interface, an IEEE 1394 interface, a Bluetooth module or an IR transmission module. Since specified programs and specified procedures are required to execute such synchronous replication, such synchronous replication is not user friendly.

It is more inconvenient for sharing data files between two electronic devices by executing such synchronous replication. Hereinafter, a process of sharing a data file edited by a notebook computer at a first place (e.g. office) with a desktop computer at a second place (e.g. home) will be illustrated in more details as follows. First of all, the data file is edited by the notebook computer at the office. Next, the data file is copied to a portable hard disc. The portable hard disc is then plugged into the desktop computer at home. After the data file is opened and edited by the desktop computer, the edited data file is copied to the portable hard disc again. Afterwards, the portable hard disc is then plugged into the notebook computer at the office to share the edited data file contained in the portable hard disc, so that the notebook computer has the newest profile information. The process of sharing a great amount data files between two electronic devices becomes more troublesome and time-consuming.

There is a need of a providing a portable electronic device having a synchronous processing module to obviate the drawbacks encountered from the prior art.

SUMMARY OF THE INVENTION

It is an object of the present invention to provide a portable electronic device having a synchronous processing module, in which the portable electronic device is used as the external storage medium of the external electronic device and a data file edited by the external electronic device can be shared with the portable electronic device in a time-saving and convenient manner.

In accordance with an aspect of the present invention, there is provided a portable electronic device to be communicated with an external electronic device through a transmission line. The portable electronic device includes a system chip, an enabling switch, a signal conversion circuit, a power switching circuit, a storage medium and a synchronous processing module. The enabling switch is triggered to issue an analog signal. The signal conversion circuit is electrically connected to the enabling switch for converting the analog signal into a digital control signal. The power switching circuit is electrically connected to the signal conversion circuit for selecting one of multiple power sources to be outputted as a voltage signal. The storage medium is electrically connected to the power switching circuit and receives the voltage signal. The synchronous processing module is electrically connected to the system chip, the storage medium, the signal conversion circuit, the power switching circuit and the transmission line. In response to the digital control signal, the storage medium is communicated with the external electronic device through the transmission line, so that the storage medium of the portable electronic device is used as an external storage medium of the external electronic device.

In accordance with another aspect of the present invention, there is provided a portable electronic device to be communicated with an external electronic device through a transmission line. The portable electronic device includes a system chip, an enabling switch, a signal conversion circuit, a power switching circuit, a storage medium and a synchronous processing module. The signal conversion circuit is electrically connected to the enabling switch and the system chip for converting an analog signal issued from the system chip or the enabling switch into a digital control signal. The power switching circuit is electrically connected to the signal conversion circuit for selecting one of multiple power sources to be outputted as a voltage signal. The storage medium is electrically connected to the power switching circuit and receives the voltage signal. The synchronous processing module is electrically connected to the system chip, the storage medium, the signal conversion circuit, the power switching circuit and the transmission line. In response to the digital control signal, the storage medium is communicated with the external electronic device through the transmission line, so that the storage medium of the portable electronic device is used as an external storage medium of the external electronic device.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention relates to a portable electronic device having a synchronous processing module. In accordance with a key feature of the present invention, the storage medium of the portable electronic device is communicated with an external electronic device through a transmission line when the portable electronic device is at a hibernation mode or a power-off mode. As a consequence, the portable electronic device is served as an external storage medium of the external electronic device.

Figure 1:
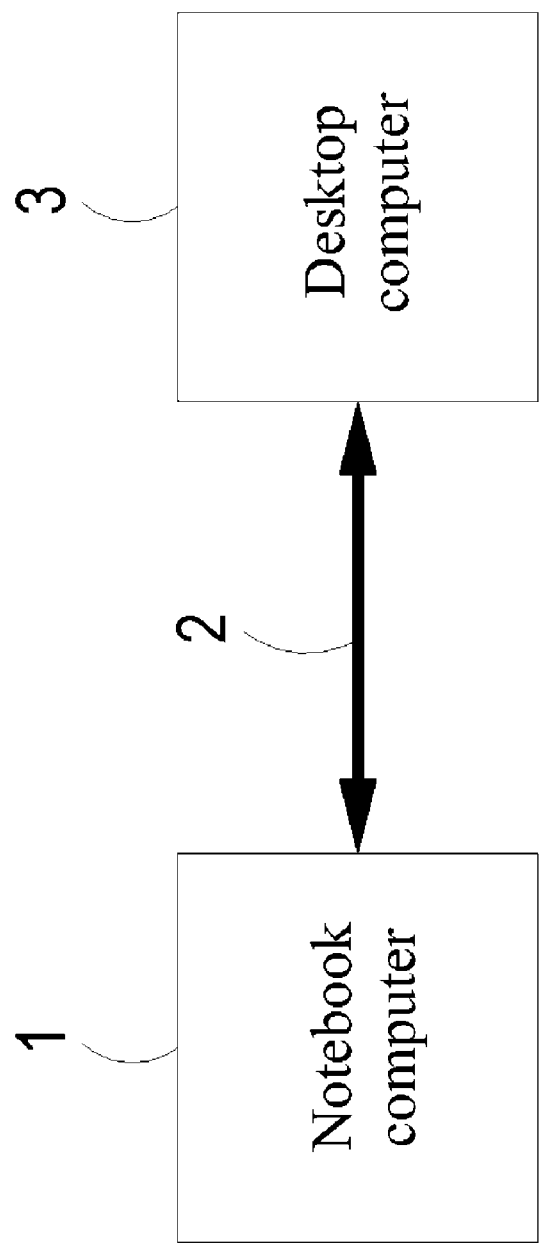
FIG. 1 is a schematic functional diagram illustrating synchronous replication between a notebook computer and a desktop computer according to the present invention.

Please refer to FIG. 1, which is a schematic functional diagram illustrating synchronous replication between a notebook computer and a desktop computer according to the present invention.

An example of the portable electronic device includes but is not limited to a notebook computer 1. The external electronic device is for example a desktop computer 3. When the notebook computer 1 is at a hibernation mode S4 or a power-off mode S5 according to the Advanced Configuration and Power Management Interface (ACPI) specification, the circuitry inside the notebook computer 1 is triggered to enable communication between the notebook computer 1 and the desktop computer 3 through a transmission line 2. Therefore, the storage medium of the notebook computer 1 is served as an external storage medium of the desktop computer 3. After the notebook computer 1 is communicated with the desktop computer 3, a data file edited by the desktop computer 3 can be shared with the notebook computer 1, so that the storage medium of the notebook computer 1 has the newest profile information. In comparison with the prior art, the synchronous replication of the present invention is more convenient.

Figure 2:
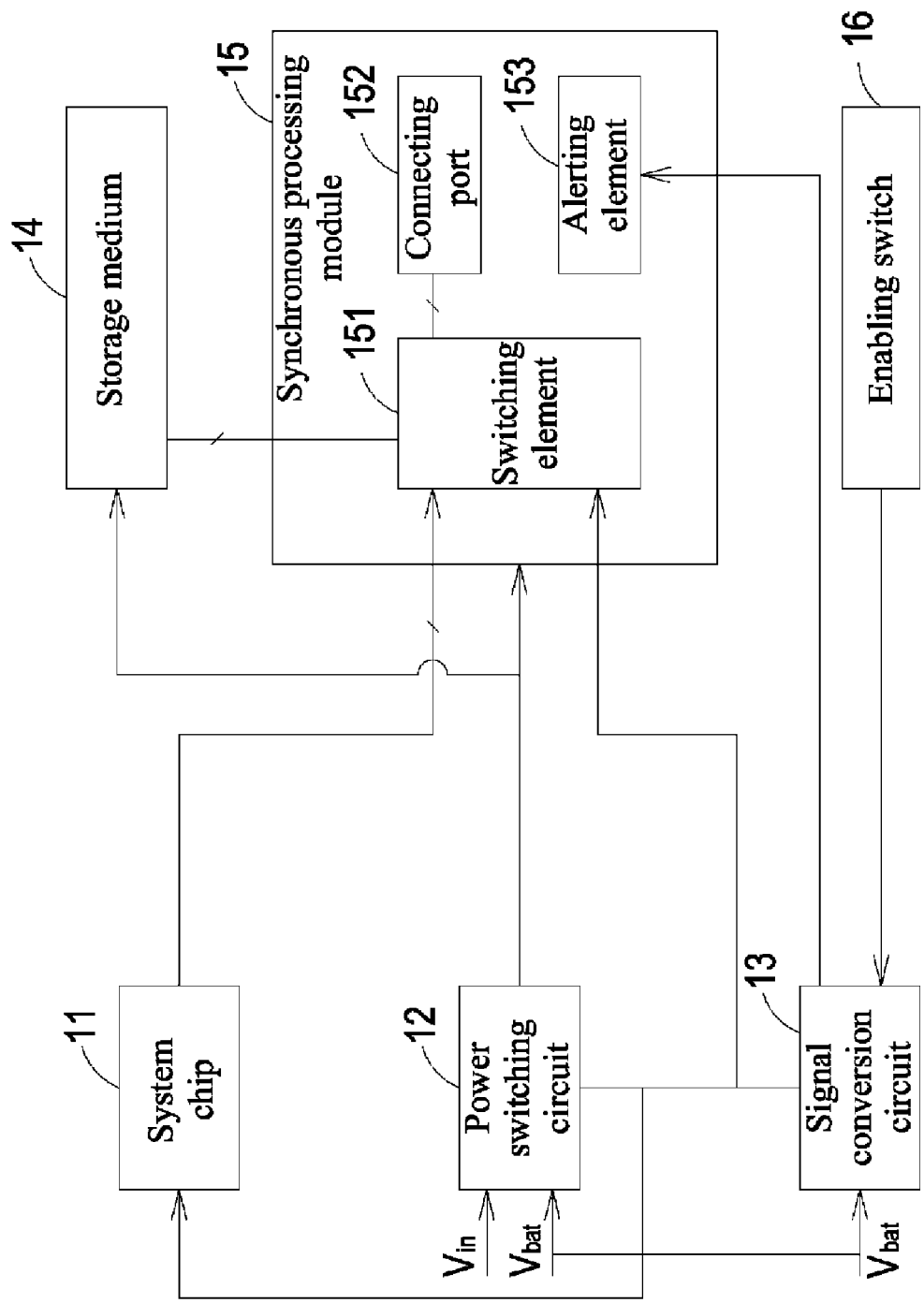
FIG. 2 is a schematic circuit configuration of a notebook computer according to a first preferred embodiment of the present invention.

Referring to FIG. 2, a schematic circuit configuration of a notebook computer according to a first preferred embodiment of the present invention is illustrated. The notebook computer 1 principally includes a system chip 11, a power switching circuit 12, a signal conversion circuit 13, a storage medium 14, a synchronous processing module 15 and an enabling switch 16. An example of the enabling switch 16 includes but is not limited to a mechanical transfer switch. For a purpose of serving the storage medium 14 as the external storage medium of the desktop computer 3, the enabling switch 16 needs to be triggered, so that an analog signal is issued and transmitted to the signal conversion circuit 13.

The signal conversion circuit 13 is electrically connected to the power switching circuit 12, the system chip 11 and the synchronous processing module 15. By the signal conversion circuit 13, the analog signal issued from the enabling switch 16 is converted into a digital control signal. In a case that no digital control signal is received by the power switching circuit 12, the utility power $V_{in}$ is selected to transmit to the storage medium 14 and the synchronous processing module 15. Whereas, in a case that the digital control signal is received by the power switching circuit 12, a backup power $V_{bat}$ provided by a built-in battery (not shown) is selected to transmit to the storage medium 14 and the synchronous processing module 15. The system chip 11 is a south bridge chip. In response to the digital control signal, the power-saving mode of the system chip 11 is changed from a normal mode S0 to a hibernation mode S4 or a power-off mode S5.

Please refer to FIG. 2 again. The synchronous processing module 15 includes a switching element 151, a connecting port 152 and an alerting element 153. In this embodiment, an exemplary connecting port 152 includes but is not limited to a high-speed SATA interface (e.g. an eSATA interface), a USB interface or an IEEE 1394 interface. Via the connecting port 152, the notebook computer 1 is communicated with the desktop computer 3, as is shown in FIG. 1. Moreover, in response to a driving signal issued from the signal conversion circuit 13, the alerting element 153 emits an alert signal to notify the user that the built-in battery of the notebook computer 1 is nearly exhausted.

The switching element 151 is electrically connected to the signal conversion circuit 13, the system chip 11, the storage medium 14 and the connecting port 152. The storage medium 14 is selectively connected to the system chip 11 or the connecting port 152 by the switching element 151. When the notebook computer 1 is operated in the normal mode and no digital control signal is transmitted from the signal conversion circuit 13 to the switching element 151, the storage medium 14 is connected to the system chip 11 through the switching element 151. On the contrary, when the notebook computer 1 is at the hibernation mode S4 or the power-off mode S5 and the digital control signal issued from the signal conversion circuit 13 is transmitted to the switching element 151, the storage medium 14 is connected to the connecting port 152 through the switching element 151, so that the storage medium 14 of the notebook computer 1 is used as the external storage medium of the desktop computer 3. Meanwhile, a data file edited by the desktop computer 3 can be shared with the notebook computer 1, so that the storage medium 14 of the notebook computer 1 has the newest profile information.

Figure 3:
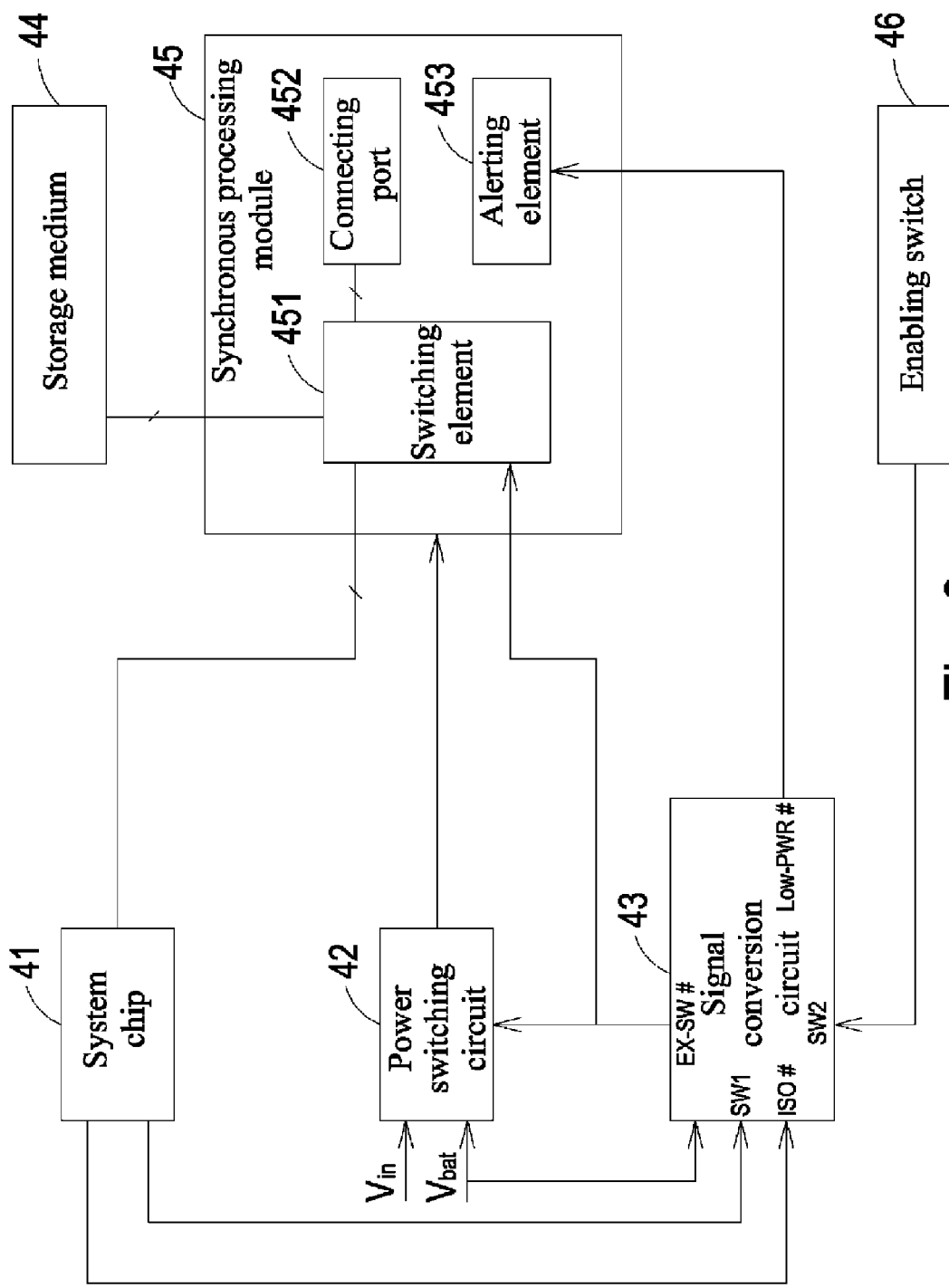
FIG. 3 is a schematic circuit configuration of a notebook computer according to a second preferred embodiment of the present invention.

Referring to FIG. 3, a schematic circuit configuration of a notebook computer according to a second preferred embodiment of the present invention is illustrated. The notebook computer 4 principally includes a system chip 41, a power switching circuit 42, a signal conversion circuit 43, a storage medium 44, a synchronous processing module 45 and an enabling switch 46. The operation principles of the power switching circuit 42, the storage medium 44, the synchronous processing module 45 and the enabling switch 46 are identical to those described in FIG. 2, and are not redundantly described herein.

In this embodiment, when the enabling switch 46 is triggered, an analog signal SW2 is issued and transmitted to the signal conversion circuit 43. By the signal conversion circuit 43, the analog signal issued from the enabling switch 46 is converted into a digital control signal EX-SW#. In response to the digital control signal EX-SW#, the power-saving mode of the system chip 41 is changed from a normal mode S0 to a hibernation mode S4 or a power-off mode S5. When the storage medium 44 is connected to the connecting port 452 through the switching element 451, the storage medium 44 of the notebook computer 4 is used as the external storage medium of the desktop computer 3.

On the other hand, when a hot key (e.g. a power button) of the notebook computer 4 is triggered, the power-saving mode of the system chip 41 can be changed from a normal mode S0 to a hibernation mode S4 or a power-off mode S5 and another analog signal SW1 is issued from the system chip 41 and transmitted to the signal conversion circuit 43. By the signal conversion circuit 43, the analog signal SW1 issued from the system chip 41 is converted into a digital control signal EX- SW#. The digital control signal EX-SW# may control operations of the power switching circuit 42 and the switching element 451 of the synchronous processing module 45, so that the backup power $V_{bat}$ provided by a built-in battery (not shown) can be transmitted to the storage medium 44 and the synchronous processing module 45. In response to the digital control signal EX-SW#, the switching element 451 is triggered and thus the storage medium 44 is connected to the connecting port 452. Meanwhile, the storage medium 44 of the notebook computer 4 is used as the external storage medium of the desktop computer 3 and a data file edited by the desktop computer 3 can be shared with the notebook computer 4.

Figure 4:
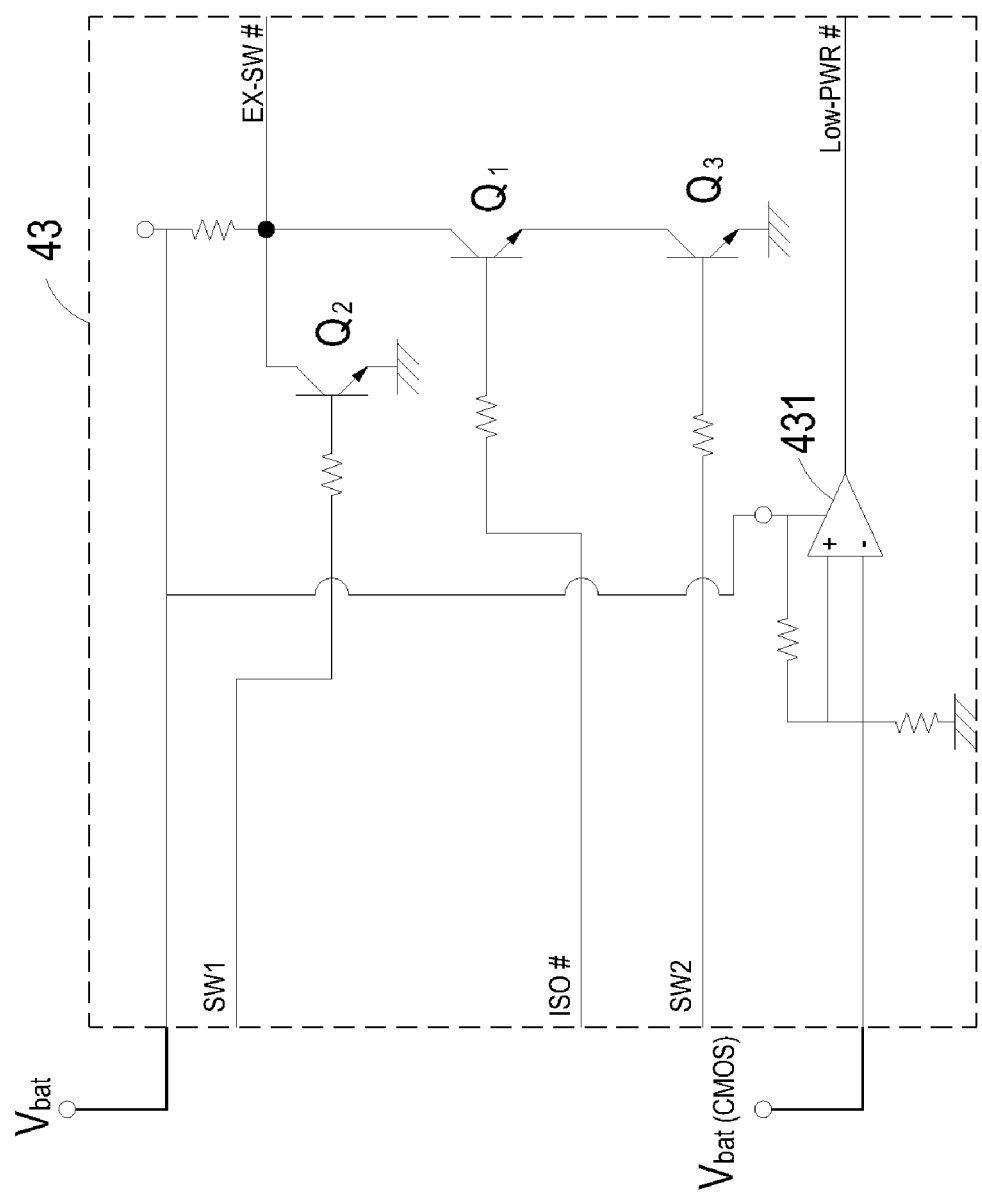
FIG. 4 is a circuit diagram of the signal conversion circuit shown in FIG. 3.

FIG. 4 is a circuit diagram of the signal conversion circuit 43 shown in FIG. 3. The signal conversion circuit 43 principally includes a comparator 431, a first switch $Q_1$, a second switch $Q_2$, a third switch $Q_3$ and several resistors. A positive input end of the comparator 431 receives the backup power $V_{bat}$ of the built-in battery. For example, the voltage magnitude of the backup power $V_{bat}$ is 5 volts. A negative input end of the comparator 431 receives a reference voltage $V_{bat}$ (CMOS), e.g. 3V. If the backup power $V_{bat}$ is smaller than the reference voltage $V_{bat}$ (CMOS), a driving voltage Low-PWR# is issued from the comparator 431 and transmitted to the alerting element 453 of the synchronous processing module 45. In response to the driving signal, the alerting element 453 emits an alert signal to notify the user that the built-in battery of the notebook computer 4 is nearly exhausted. An example of the alert signal includes but is not limited to a sound prompt or a light beam.

When the notebook computer 4 is operated at the hibernation mode S4 or the power-off mode S5, the first switch $Q_1$ is conducted in response to a control signal ISO# issued from the system chip 41. Until the enabling switch 46 is triggered to issue the analog signal SW2, the third switch $Q_3$ is conducted in response to the analog signal SW2 and thus the digital control signal EX-SW# is issued from the signal conversion circuit 43. In response to the digital control signal EX-SW#, the backup power $V_{bat}$ provided by the built-in battery can be transmitted to the storage medium 44 and the synchronous processing module 45. In response to the digital control signal EX-SW#, the switching element 451 is triggered and thus the storage medium 44 is connected to the connecting port 452. In addition, the switching element 451 is triggered in response to the digital control signal EX-SW#, so that the storage medium 44 is connected to the connecting port 452.

When a hot key of the notebook computer 4 is triggered, another analog signal SW1 is issued from the system chip 41 to the signal conversion circuit 43. In response to the analog signal SW1, the second switch $Q_2$ is conducted and thus the digital control signal EX-SW# is issued from the signal conversion circuit 43. In response to the digital control signal EX-SW#, the switching element 451 is triggered and thus the storage medium 44 is connected to the connecting port 452. In addition, the switching element 451 is triggered in response to the digital control signal EX-SW#, so that the storage medium 44 is connected to the connecting port 452.

From the above description, the portable electronic device of the present invention can be communicated with an external electronic device through a transmission line by means of a synchronous processing module. When the portable electronic device is operated at the hibernation mode or the power-off mode, the portable electronic device can be used as the external storage medium of the external electronic device. Under this circumstance, a data file edited by the external electronic device can be shared with the portable electronic device so that the storage medium of the portable electronic device has the newest profile information.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A portable electronic device to be communicated with an external electronic device through a transmission line, said portable electronic device comprising:
   a system chip;
   an enabling switch triggered to issue an analog signal;
   a signal conversion circuit electrically connected to said enabling switch for converting said analog signal into a digital control signal;
   a power switching circuit electrically connected to said signal conversion circuit for selecting one of multiple power sources to be outputted as a voltage signal;
   a storage medium electrically connected to said power switching circuit and receiving said voltage signal; and
   a synchronous processing module electrically connected to said system chip, said storage medium, said signal conversion circuit, said power switching circuit and said transmission line, wherein in response to said digital control signal, said storage medium is communicated with said external electronic device through said transmission line, so that said storage medium of said portable electronic device is used as an external storage medium of said external electronic device, wherein said storage medium is communicated with said external electronic device through said transmission line when said portable electronic device is at a hibernation mode or a power-off mode.

2. The portable electronic device according to claim 1 wherein said portable electronic device is a notebook computer, and said external electronic device is a desktop computer.

3. The portable electronic device according to claim 1 wherein said enabling switch is a mechanical transfer switch.

4. The portable electronic device according to claim 1 wherein said synchronous processing module includes a switching element electrically connected to said signal conversion circuit, said system chip and said storage medium, wherein said switching element is triggered by said digital control signal.

5. The portable electronic device according to claim 4 wherein said synchronous processing module further includes a connecting port electrically connected to said switching element and said transmission line such that said portable electronic device is communicated with said external electronic device through said transmission line.

6. The portable electronic device according to claim 5 wherein said connecting port is an eSATA interface port, a USB interface port or an IEEE 1394 interface port.

7. The portable electronic device according to claim 4 wherein said synchronous processing module further includes an alerting element electrically connected to said signal conversion circuit for emitting an alert signal in response to a driving signal issued from said signal conversion circuit.

8. The portable electronic device according to claim 7 wherein said multiple power sources includes utility power and a built-in battery.

9. The portable electronic device according to claim 8 wherein said signal conversion circuit further includes a comparator for comparing said voltage signal issued from said built-in battery with a reference voltage signal, wherein said driving signal is issued from said signal conversion circuit to said alerting element so as to trigger said alerting element to emit said alert signal.

10. The portable electronic device according to claim 1 wherein said system chip is a south bridge chip.

11. A portable electronic device to be communicated with an external electronic device through a transmission line, said portable electronic device comprising:

a system chip;

an enabling switch;

a signal conversion circuit electrically connected to said enabling switch and said system chip for converting an analog signal issued from said system chip or said enabling switch into a digital control signal;

a power switching circuit electrically connected to said signal conversion circuit for selecting one of multiple power sources to be outputted as a voltage signal;

a storage medium electrically connected to said power switching circuit and receiving said voltage signal; and a synchronous processing module electrically connected to said system chip, said storage medium, said signal conversion circuit, said power switching circuit and said transmission line, wherein in response to said digital control signal, said storage medium is communicated with said external electronic device through said transmission line, so that said storage medium of said portable electronic device is used as an external storage medium of said external electronic device, wherein said storage medium is communicated with said external electronic device through said transmission line when said portable electronic device is at a hibernation mode or a power-off mode.

\* \* \* \* \*